United States Patent [19]
Hensel

[11] 3,995,823
[45] Dec. 7, 1976

[54] ADJUSTABLE CEILING SUSPENSION
[75] Inventor: Erich Emil Hensel, Wassenaar, Netherlands
[73] Assignee: Hunter Douglas International N.V., Curacao, Netherlands Antilles
[22] Filed: Oct. 10, 1975
[21] Appl. No.: 621,415
[30] Foreign Application Priority Data
Oct. 14, 1974 Netherlands ............... 7413507
[52] U.S. Cl. .................. 248/327; 52/484
[51] Int. Cl.[2] ............ F16L 3/00; E04B 5/52; E04B 5/00
[58] Field of Search .......... 248/327, 328, 59, 317; 52/484

[56] References Cited
UNITED STATES PATENTS
1,561,755  11/1925  Taseff ............... 248/317 UX
3,708,932   1/1973  Bailey ............... 52/484 X
3,881,673   5/1975  Peterson ............ 248/327 X FOREIGN PATENTS OR APPLICATIONS
249,129  5/1960  Australia ........... 52/484
666,936 11/1965  Belgium ............ 52/484
189,262  5/1964  Sweden ............. 52/484

Primary Examiner—J. Franklin Foss
Attorney, Agent, or Firm—Pennie & Edmonds

[57] ABSTRACT

This invention relates to a suspension device, in particular for a ceiling, consisting of essentially C- or V-shaped clamp straps having ears of flexible spring metal and a supporting rod cooperating therewith, said rod being provided with a suspension member and held vertically adjustable in openings in the diverging clamp ears, wherein the ears of the clamp are bent from a common flat connecting element, which is provided with means for attachment of the suspension device to ceiling support elements.

9 Claims, 4 Drawing Figures

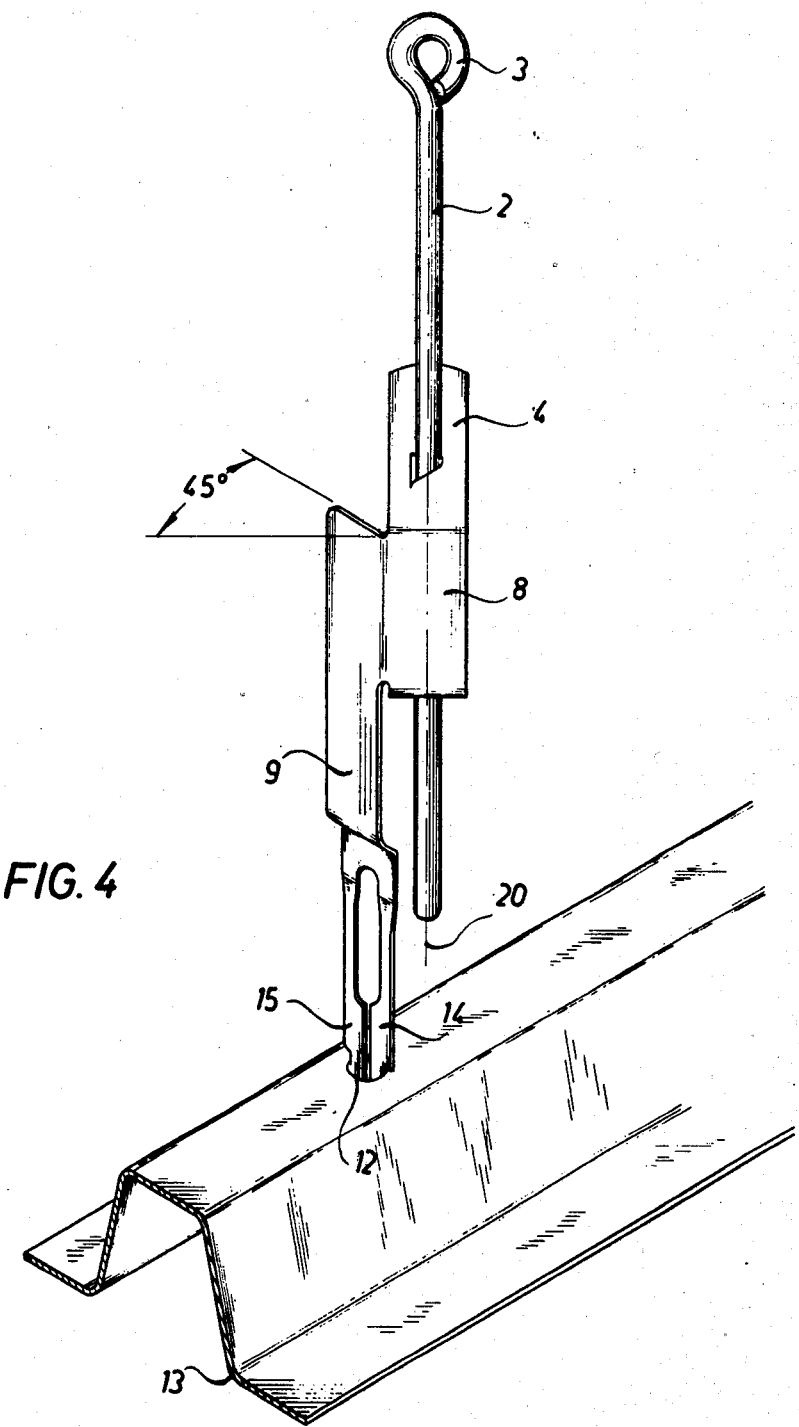

ADJUSTABLE CEILING SUSPENSION

BACKGROUND OF THE INVENTION

An existing suspension device has the disadvantage that the clamp strap, when the ears of the clamp are somewhat compesssed, can be shifted only intermittently along the supporting rod and cannot be adjusted with an accuracy of 2 to 3mm. Further, ceiling support elements in the case of one known suspension device can not be fastened quickly and expeditiously to the clamp straps. On the clamp straps the fastening means for ceiling support elements are often so designed that the latter must be provided with special slots and/or holes in order to make assembly possible. For connection with a ceiling support element a quarter-turn must be made with a part of the clamp strap in this slot under difficult circumstances and locking into this position then proceeds by means of a special auxiliary piece. This complicated assembly has an adverse effect on the cost of installation of a ceiling.

SUMMARY OF THE INVENTION

This invention seeks to eliminate the aforementioned drawbacks by a suspension device constructed with a minimum of component parts whereby, nevertheless, dependable quick assembly may be accomplished.

Pursuant to the invention, at least one of the openings in the ears of the clamp is provided with a cutting edge bent out from the respective ear of the clamp, which edge occupies a position such that counter-rotation of clamp strap and supporting rod produces a spiral motion. This makes possible quick and simultaneously accurate and fine adjustment of the clamp strap with reference to the supporting rod.

In optimal application of the invention each opening in each ear of the clamp is provided with a cutting edge, which edges are bent in relation to each other in such a manner that they in effect lie on one and the same spiral in relation to the supporting rod.

Pursuant to a second aspect of the invention, the flat connecting element contains locking means for attachment in apertures of ceiling support elements. The clamp strap may thereby be attached quickly and expeditiously to the support, while an extra auxiliary piece for locking, as in the case of existing systems, is not necessary.

Pursuant to another feature of the invention, the lower end of the connecting element is fork-shaped and consists of two parallel, narrow, flexible legs which are twisted at an angle with respect to the surface of the remaining part of the connecting element, wherein the end of each leg is provided with a quiding edge running to the tip, which edge includes a recess serving to hold fast the edge of the opening in the ceiling support element.

In another embodiment pursuant to the invention, the surface of the connecting element near the clamp strap is bent aside at an angle in relation to a parallel to the supporting rod.

To sum up, the suspension device pursuant to the invention provides, at minimum cost for materials, remarkably excellent service, significantly better than it is possible to achieve with the known suspension devices. An unusual advantage is that assembly and disassembly may proceed quickly and with great accuracy, and are conveniently performed without any special tools.

BRIEF DESCRIPTION OF THE DRAWINGS

The invention is more clearly illustrated with the aid of the drawing in which:

FIG. 4 shows, in perspective, another embodiment of the suspension device.

DETAILED DESCRIPTION

The suspension device includes a supporting rod 2, provided with a suspension member 3, which rod cooperates in known manner with an essentially C- or V-shaped clamp strap 1 of flexible spring-like material perferably metal.

Figure 2:
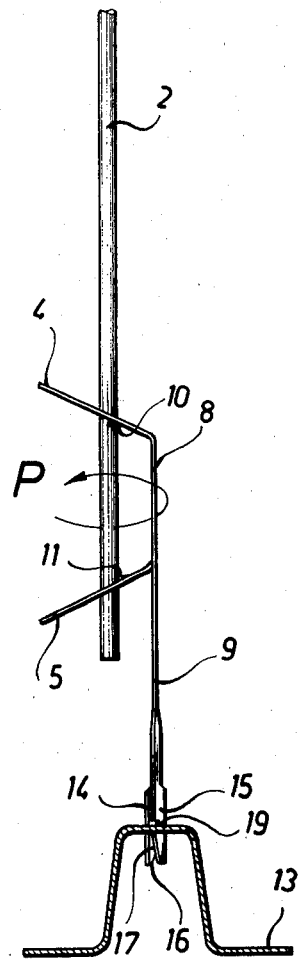
FIG. 2 shows a side view, seen in the direction of arrow A of FIG. 1, in which, however, the ceiling support element occupies a different position.

From the flat part 8 of the clamp strap 1 diverge clamp ears 4 and 5, in which are located openings 6 and 7, which cooperate with the supporting rod 2 inserted therein. By squeezing the ears 4 and 5 of the clamp toward each other with the fingers, the clamp strap 1 may easily be shifted on the supporting rod 2 to the desired position, whereupon after release the two clamp ears 4 and 5 spring back, thereby firmly holding fast the supporting rod 2. The openings 6 and 7 are provided with cutting edges 10 and 11, which are bent out from the surfaces of the clamp ears 4 and 5. These cutting edges 10 and 11 produce on rotation of the clamp strap 1 around the supporting rod 2 a longitudinal shift of the clamp strap 1 on the supporting rod 2. As shown in FIG. 2, when the clamp strap 1 is rotated in the direction of the arrow P the clamp strap will move downwardly (as viewed in FIG. 2) with respect to supporting rod 2 thus lengthening the support device and lowering the ceiling support element 13. Rotation of the clamp strap 1 in the direction opposite to the arrow P, on the other hand, will move clamp strap 1 upwardly as viewed in FIG. 2, thus raising ceiling support element 13. As shown, the cutting edges 10 and 11 are aligned in relation to each other and lie on one and the same imaginary spiral. The pitch of this spiral and hence the position of the cutting edges 10 and 11 determine the magnitude of the longitudinal displacement of the clamp strap 1 when it is rotated. This makes it possible to give the cutting edges 10 and 11 a position such that one rotation of the clamp strap 1 around the supporting rod 2 will produce a longitudinal displacement of about 2 mm.

During rotation of the clamp strap 1 around the supporting rod 2 the cutting edges 10 and 11 cut threads in the stock of the supporting rod 2. The clamp strap 1 is thus held particularly tightly on the supporting rod, while the clamp ears 4 and 5 bite firmly into the stock of the supporting rod 2 in the threads cut on either side, thus producing a very tightly locked connection.

Figure 1:
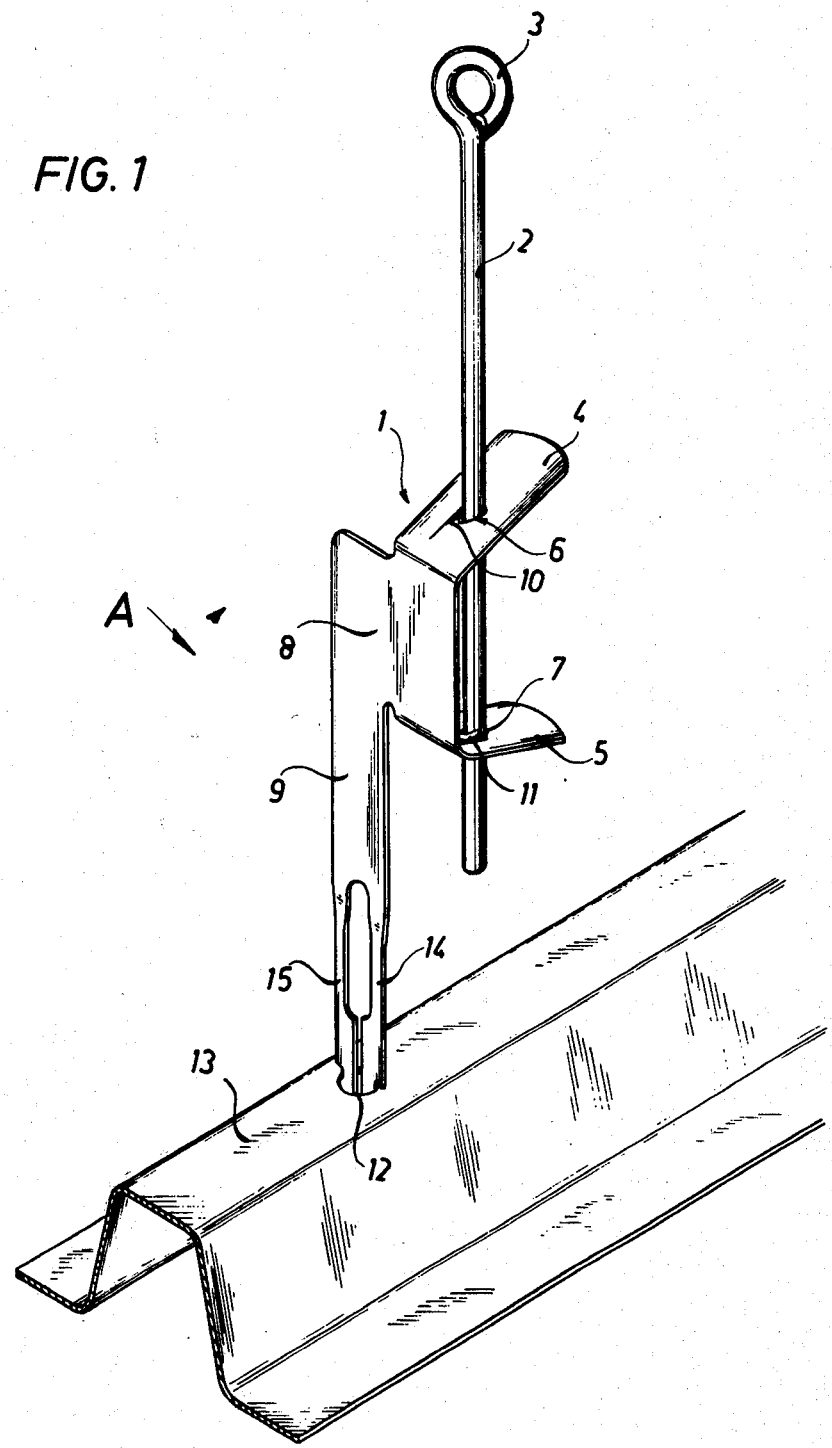
FIG. 1 shows, in perspective, the suspension device with a ceiling support element attached thereto.
Figure 3:
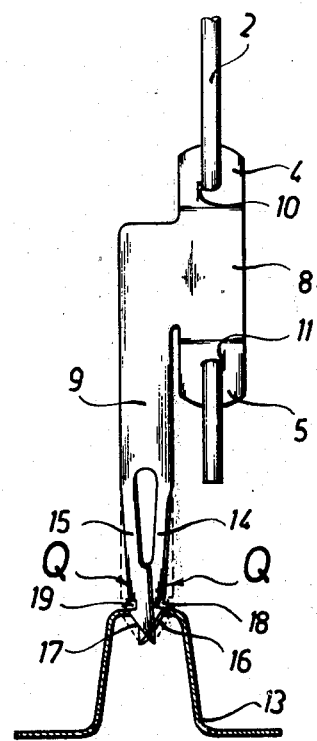
FIG. 3 shows the front view of the suspension device of FIG. 1.

The flat part 8 of the clamp strap 1 forms a whole with a flat connecting element 9 that extends downward and is provided with two flexible, narrow teeth or legs 14 and 15, which are twisted out of the plane of the flat part of the connecting element, specifically at an angle of about 20°. That is to say that each of the legs 14 and 15 is twisted about its own longitudinal axis. The direction of the twist with respect to the plane of the element 9 is the same for both legs i.e. counterclockwise when viewed from below in FIGS. 1–3. The amount of twist is such as to produce an angle of about 20° between the plane of the connecting element 9 and the plane of leg 14 as well as between the plane of the connecting element 9 and the plane of the leg 15. The planes of the legs 14 and 15 are, therefore, spaced but parallel. In this position of legs 14 and 15 they are capable of passing each other when they are squeezed toward each other.

Further, the ends of the legs 14 and 15 are provided with guiding edges 16 and 17 respectively, which guiding edges extend to the tip. Rectangular notches or recesses 18 and 19 cooperate with and embrace the edge of a round aperture 12 in the ceiling support element 13, on which ceiling elements may be attached. For assembly, the guiding edges 16 and 17 are brought before the aperture 12 in the support 13 and the tips are inserted into the aperture. Further insertion causes the legs 14 and 15 to pass each other sideways. As soon as the recesses or notches 18 and 19 reach the level of the aperture 12 of the support 13 the legs 14 and 15 are again spread by their elasticity, such that the notches 18 and 19, due to their shape, embrace the metal at the edge of the aperture 12 (see dotted position in FIG. 3). In this manner the suspension device is removably connected to the ceiling support element 13. For disassembly the legs 14 and 15 are squeezed together edgeways (see direction of arrows Q in FIG. 3) and the connection is released. It is however, possible to remove the clamp strap 1 together with the ceiling support element 13 from the supporting rod by squeezing ears 4 and 5 toward each other and while so squeezed sliding the clamp strap down off the rod 2.

With the clamp strap 1 quick and expeditious connection with a support 13 for ceiling elements may be effected and, in addition to quick vertical adjustment, any required accurate and fine adjustment with relation to the support rod 2 is also achieved.

Any desired fine adjustment of the clamp strap 1 in relation to the supporting rod 2 is made possible by the above described screw motion. Forces occurring on the suspension device are absorbed well with no permanent deformation occurring in the stock. Reduction of the effective moments of force, moreover, may be attained if the distance between the parallel legs 14 and 15 and the center line 20 of the supporting rod 2 is kept as small as possible. To this end (in the embodiment according to FIG. 4) the surface of the flat connecting element 9, at the point of transition to the flat part 8 of the clamp strap 1, is bent through an angle of 45° as shown in FIG. 4. The lower end of the connecting element 9, at which the two teeth or legs 14 and 15 are located, is displaced as closely as possible to the center line 20 of the supporting rod 2 by means of a double opposite bend of the material. Thus the space between the two legs 14 and 15, on the one hand, the center line 20 of the supporting rod 2, on the other, is considerably smaller than in the case of the embodiment of FIGS. 1 to 3, as are also the moments of force occuring. The clamp strap 1 is preferably made of a punched-out piece of metal, for example of spring steel, having a thickness of 0.5 – 0.6 mm. The invention is in no way limited to the examples or embodiments described, but includes all variations which a person versed in the art, without disregarding the principles of the invention, is able to deduce therefrom.

I claim:

1. A suspension device for ceilings comprising a clamp, said clamp being shaped from a piece of resilient metal, said clamp including a pair of diverging ears extending therefrom, an opening in each of said ears, said openings being in alignment with each other, a supporting rod extending through said aligned openings, means for connecting said clamp to a ceiling support element, and at least one of said openings being provided with a cutting edge bent outwardly from the surface of the respective ear of said clamp whereby relative rotation of said clamp and said supporting rod causes said clamp to be screwed longitudinally with respect to said supporting rod.

2. The suspension device of claim 1 in which each of the openings in each of said ears is provided with a cutting edge bent outwardly from the surface of its respective ear, and in which said cutting edges lie on the same spiral line with respect to said connecting rod.

3. A suspension device for ceilings comprising a clamp of resilient metal, said clamp including ears bent outwardly therefrom and diverging with respect to each other, each of said ears having an opening therethrough, said openings being in alignment with each other, a supporting rod extending through said openings, said clamp also including a substantially flat connecting element, a ceiling support element, an aperture in said ceiling support element, said connecting element including a first portion connected to said ears and two resilient legs integral with said first portion, each of said legs being twisted along its longitudinal axis with respect to said first portion whereby said legs lie in spaced, parallel planes; and the outer edge of each of said legs having an outwardly opening notch for engagement with the periphery of said aperture.

4. The suspension device of claim 3 in which each of said outer edges comprises a guiding edge extending from each of said notches to the terminus of each of said legs.

5. The suspension device of claim 4 in which said connecting element is bent along a line parallel to said supporting rod such that said legs are positioned closer to the axis of said supporting rod than would otherwise be the case.

6. The suspension device of claim 5 in which the portion of said connecting element which includes said legs is offset towards said supporting rod.

7. A suspension device for ceilings comprising a clamp of resilient metal; said clamp having a pair of ears bent outwardly with respect thereto with said ears being divergent; an opening in each of said ears; said openings in said ears being in alignment; a supporting rod extending through said aligned openings; said clamp also including a flat connecting element; a cutting edge bent out from the surface of at least one of said ears at the opening therein; the engagement of said cutting edge with said supporting rod being such that upon relative rotation of said clamp and said supporting rod said clamp will be screwed longitudinally with respect to said supporting rod; said connecting element including a pair of legs; each of said legs being twisted along its longitudinal axis with respect to the major plane of said connecting element in such a manner as to position said legs in spaced, parallel planes; the outer edge of each of said legs having an outwardly opening notch; and said outer edges comprising guiding edges extending from their respective notches to the terminus of their respective legs.

8. The suspension device of claim 7 in which said guiding edges are closer to each other at said terminus than at said notches.

9. The suspension device of claim 8 in which each of said ears has a cutting edge bent out from its surface at the opening therein and in which said cutting edges lie on the same spiral line with respect to said connecting rod whereby upon relative rod of said clamp and said supporting rod in one direction said clamp will be screwed longitudinally in a first direction with respect to said supporting rod and upon relative rotation in the direction opposite to said one direction said clamp will be screwed longitudinally with respect to said supporting rod in a direction opposite to said first direction.

* * * * *